United States Patent

Perotti et al.

[15] 3,648,542
[45] Mar. 14, 1972

[54] PEDAL LINK ASSEMBLY FOR BICYCLES

[72] Inventors: Dino Perotti; Mario Perotti, both of via Bailo, Sarezzo, Italy

[22] Filed: Nov. 24, 1969

[21] Appl. No.: 879,400

[30] Foreign Application Priority Data

May 31, 1969 Italy ................................. 2768A/69

[52] U.S. Cl. ........................................ 74/594.1, 287/52.02
[51] Int. Cl. ................................................... G05g 1/14
[58] Field of Search ............... 74/594.1, 594.2; 287/52.02, 287/53; 301/2.5

[56] References Cited

UNITED STATES PATENTS 475,959   5/1892   Andrews ............................. 74/594.2
823,712   6/1906   Uhlmann ............................. 74/594.1

Primary Examiner—William F. O'Dea
Assistant Examiner—F. D. Shoemaker
Attorney—Clario Ceccon

[57] ABSTRACT

Pedal link for bicycles composed of a central hub of lightweight alloy or equivalent material, to which are connected through openings the pedal supporting link and the sprocket shaft. The link has a threaded extension which is secured ultimately by a nut and the shaft has a terminal, normal opening to allow passage therethrough of the threaded extension of the link. Bevelled surfaces on the link and in the shaft's opening ensure precision fitting of the pedal link components.

2 Claims, 3 Drawing Figures

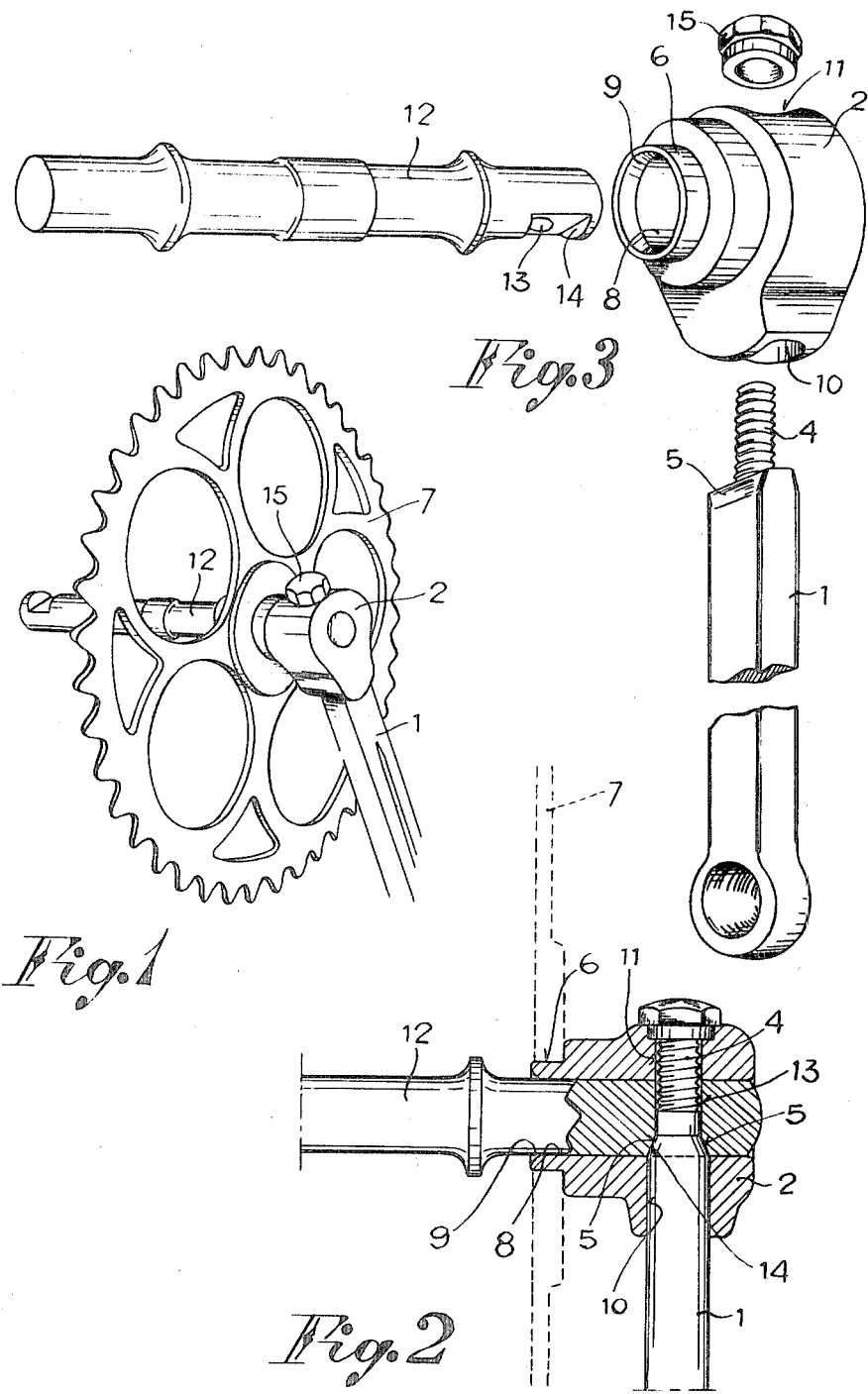

PEDAL LINK ASSEMBLY FOR BICYCLES

FIELD OF THE INVENTION

The present invention relates to a pedal link for bicycles comprising two distinct elements cooperating with each other and connected with each other and with the shaft of the sprocket by means of a single blocking nut.

THE PRIOR ART

Heretofore pedal links for bicycles and similar vehicles have been manufactured as a single block or unit comprising a shaft carrying the pedal proper at one end and a shaped hub at the other, within which hub there was provided a transverse opening for seating the controlling member for the sprocket wheel. The blocking of the controlling member on each of the two pedal links was obtained by means of a small bolt fixed and positioned by a nut threaded thereon.

SUMMARY OF THE INVENTION

The pedal link of the invention is comprised of (a) a steel member, preferably pre-stamped, having at its upper terminal a threaded extension and at its lower terminal a suitable opening for the insertion therein of the pedal proper; and (b) a connecting member or hub, preferably made of light alloy or of tubularly shaped metal, within which there is provided a first opening for the shaft of the sprocket wheel and a second opening axially perpendicular to the first one for receiving the link member itself.

In accordance with one embodiment of the invention, the threaded extension of the link passes through an opening transversely provided in the shaft of the sprocket and through an opening provided in the upper portion of the hub, to be finally blocked by a threaded nut and be secured as a unit to the link member itself and to the shaft of the sprocket wheel.

According to another characteristic of the invention, the steel link is provided at its upper extremity in the vicinity of the threaded extension thereof with two lateral bevels cooperating with two inclined, lateral surfaces of an opening provided in the shaft. This feature ensures the dove-tailed connection and engagement necessary to prevent any displacement of the link with respect to the shaft.

The purpose of the invention is, therefore, to provide a pedal link for bicycles which can be manufactured economically, as compared with prior methods where no light-metal hubs or equivalent elements could be employed.

DESCRIPTION OF THE DRAWINGS

The present invention will become more apparent with reference to the accompanying drawings, in which:

FIG. 1 is a perspective view of the assembly of the elements of the invention;

FIG. 2 is a partially cut-away view of the hub-link-shaft portion of the device; and FIG. 3 is an exploded perspective view of the elements of the invention cooperating with the sprocket.

DESCRIPTION OF THE EMBODIMENT

The pedal link of the invention consists of a link member 1, preferably of steel, and of a hub 2, preferably obtained from aluminum casting or light-metal casting or equivalent procedure. If desired, synthetic plastic materials, having the required mechanical properties, may be employed.

The link 1 has in its lower part an opening (not numbered) for the insertion therein of the pedal proper. In the opposite, upper part of link 1 there is a threaded extension or stem 4, at the very base of which there are provided two lateral tapered surfaces 5, the function of which will become clearer hereafter.

The hub 2 shows externally a boss 6 on which is mounted and fixed in conventional manner the sprocket wheel 7. Internally of the hub 2 there is an axial bore 8 having a bevelled opening (FIG. 2). The hub is also provided with a bottom opening 10 having dimensions and shape corresponding to those of the transverse section of the link 1, and with an upper or top opening 11 for receiving the threaded stem 4 of the link. The openings 10 and 11 are coaxial with respect to each other and axially perpendicular with respect to bore 8.

To assemble the pedal link, hereabove described, the extremity of shaft 12 is inserted in the bore 8 of the hub 2. The shaft 12, in turn is provided with a transverse opening 13 coaxially aligned with openings 10 and 11 of the hub 2. In the lower part of opening 13 there is provided a boss defined by the two lateral inclined surfaces 14.

After the shaft is inserted in the bore 8, the link 1 is introduced in the corresponding opening 10 of the hub 2, so that the lateral bevels 5 thereof match and cooperate with the inclined surfaces 14 of the shaft. The threaded extension 4 thus is passed through the opening 13 of the shaft and the opening 11 of the hub 2, as shown clearly in FIG. 2 of the accompanying drawings.

The assembled components are finally secured by means of nut 15 threaded on the extension 4 of the link, so as to block perfectly the various parts of the device.

What we claim is:

1. A pedal link assembly for bicycles comprising a link having a threaded extension at one end and a pair of bevelled portions at the base of said threaded extension, said link further including an opening at the other end for receiving a pedal; a hub having an opening for the passage of said link therethrough and a bore normal to the opening; a shaft connectable at one end with said hub through said bore; said one end of said shaft including an opening and a pair of bevelled surfaces laterally spaced about the opening whereby, in the assembled condition, the openings in said hub and said shaft are in alignment with said threaded extension of said link passing therethrough, and said bevelled portions of said link are seated on said bevelled surfaces of said shaft; and a nut for fastening said link to said hub.

2. The pedal link of claim 1, wherein said hub is made of different and lighter material than said link and said shaft.

* * * * *